(12) United States Patent
Holub et al.

(10) Patent No.: US 11,367,159 B1
(45) Date of Patent: Jun. 21, 2022

(54) METHODS AND ARRANGEMENTS FOR ENHANCING DETECTION OF DIGITAL WATERMARK SIGNALS

(71) Applicant: Digimarc Corporation, Beaverton, OR (US)

(72) Inventors: Vojtech Holub, Lafayette, CO (US); Tomas Filler, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 241 days.

(21) Appl. No.: 16/823,135

(22) Filed: Mar. 18, 2020

Related U.S. Application Data (60) Provisional application No. 62/820,755, filed on Mar. 19, 2019.

(51) Int. Cl.
- *G06T 1/00* (2006.01)
- *H04N 1/32* (2006.01)
- *G06Q 20/20* (2012.01)

(52) U.S. Cl.
CPC ......... *G06T 1/0021* (2013.01); *G06Q 20/208* (2013.01); *H04N 1/3216* (2013.01); *H04N 1/32219* (2013.01); *H04N 1/32267* (2013.01)

(58) Field of Classification Search
CPC .. G06T 1/0021; G06Q 20/208; H04N 1/3216; H04N 1/32219; H04N 1/32267
See application file for complete search history.

(56) References Cited

U.S. PATENT DOCUMENTS

| | | | |
|---|---|---|---|
| 6,122,403 A | 9/2000 | Rhoads | |
| 6,590,996 B1 | 7/2003 | Reed | |
| 6,614,914 B1 | 9/2003 | Rhoads | |
| 6,975,744 B2 | 12/2005 | Sharma | |
| 9,747,656 B2 | 8/2017 | Stach | |
| 9,819,950 B2 | 11/2017 | Boles | |
| 9,959,587 B2 | 5/2018 | Sharma | |
| 10,242,434 B1 | 3/2019 | Holub | |
| 2005/0036613 A1* | 2/2005 | Zhou | H04N 7/1675 348/E7.071 |
| 2016/0364623 A1 | 12/2016 | Evans | |
| 2017/0024840 A1 | 1/2017 | Holub | |
| 2019/0266749 A1 | 8/2019 | Rhoads | |
| 2019/0332840 A1 | 10/2019 | Sharma | |

FOREIGN PATENT DOCUMENTS

| WO | 2019165364 | 8/2019 |
|---|---|---|

* cited by examiner

*Primary Examiner* — Christopher Wait
(74) *Attorney, Agent, or Firm* — Digimarc Corvoration (57) ABSTRACT

In an illustrative embodiment, watermark decoding reliability is increased, for images of watermarked objects captured at close distances, by reducing influence of pixel noise (e.g., shot noise). In the same or different embodiment, watermark decoding reliability is increased, for images of watermarked objects captured from far distances, by reducing image under-sampling. A particular implementation down-samples input imagery twice—a first time by a fixed factor, preparatory to performing an FFT, and a second time by a variable factor, preparatory to submitting the image for decoding, where the variable factor is determined using results from the FFT. A number of other features and arrangements are also detailed.

18 Claims, 8 Drawing Sheets

METHODS AND ARRANGEMENTS FOR ENHANCING DETECTION OF DIGITAL WATERMARK SIGNALS

RELATED APPLICATION DATA

This application claims priority to application 62/820,755, filed Mar. 19, 2019, the disclosure of which is incorporated herein by reference.

INTRODUCTION

As digital watermarks gain adoption, they appear on a wider variety of objects, and in a wider variety of forms. Newer forms of "sparse" image watermarks are appearing on white adhesive labels applied to retail food containers, for reading by point of sale (POS) cameras. Such marks typically have small physical scales, e.g., comprising 150 or more watermark elements ("waxels") per inch.

To remain inconspicuous, digital watermark signals need to be small in amplitude. Such signals are vulnerable to various interfering sources of noise, such as shot (thermal) noise caused by the physics of individual pixel sensors. Shot noise increases with pixel value, so that bright images have more shot noise than dark images. The standard deviation of shot noise also increases with brightness. White substrates make watermarked adhesive labels a worst-case scenario, in terms of shot noise interference with watermark signals.

The small physical scale of such watermarks compounds the problem. Watermark readers commonly apply a down-sampling function prior to synchronization and decoding. Such down-sampling effects a blur function that reduces shot noise. Smaller scale watermarks are often down-sampled less, causing more shot noise to persist in the imagery analyzed for synchronization and decoding.

In accordance with one particular aspect of the present technology, pixel shot noise is combatted by adaptively down-sampling captured imagery in accordance with scale of a watermark determined by the synchronization process. By so-doing, the standard deviation of the shot noise is reduced, thereby reducing the risk of watermark interference.

The foregoing and other features and advantages of the present technology will be more readily apparent from the following detailed description, which proceeds with reference to the accompanying drawings

DETAILED DESCRIPTION

As is familiar to artisans, a digital watermark is a 2D marking that encodes a data payload in an inconspicuous manner. The data payload typically comprises plural symbols, each of which represents an M-ary value.

The value, M, in the term M-ary, is the number of possible symbol values per symbol element. In many systems, M=2. For example, each symbol can be a binary bit: 0 or 1. Alternatively, the symbols can have values of −1 and 1. M can have other values as well. For example, in the case of M=3, each symbol can have one of three states, such as 1, 0 and −1. For expository convenience, this specification assumes binary symbols (i.e., M=2).

To make a watermark data payload more robust, it can be encoded redundantly using error correction, error detection, and/or repetition. For example, 50 bits of input payload data can be transformed into a string of 1024 bits (sometimes termed a "signature") using a convolutional encoder. Each of these 1024 bits may be mapped to plural different locations within a 128×128 element watermark block (16,384 locations in all). This redundant encoding enables the 50 bits of input data to be recovered even if most of these 16,384 locations in the 2D watermark are corrupted.

In the example just-given, the convolutionally-encoded payload data defines a 128×128 array of positive or negative numbers ("tweaks"). These tweaks can serve to adjust pixel values of host artwork, increasing the values of some pixels (i.e., their luminance or chrominance values), and reducing the values of other pixels, so as to hide the watermark within the host artwork. Alternatively, these tweaks can be processed to yield a sparse marking of dots that conveys the payload data without any associated host artwork. Such a dot pattern may be printed on a white substrate region that is blank except for the dots, e.g., with 50%, or 75%, of more, of the substrate region area being left white.

Figure 1:
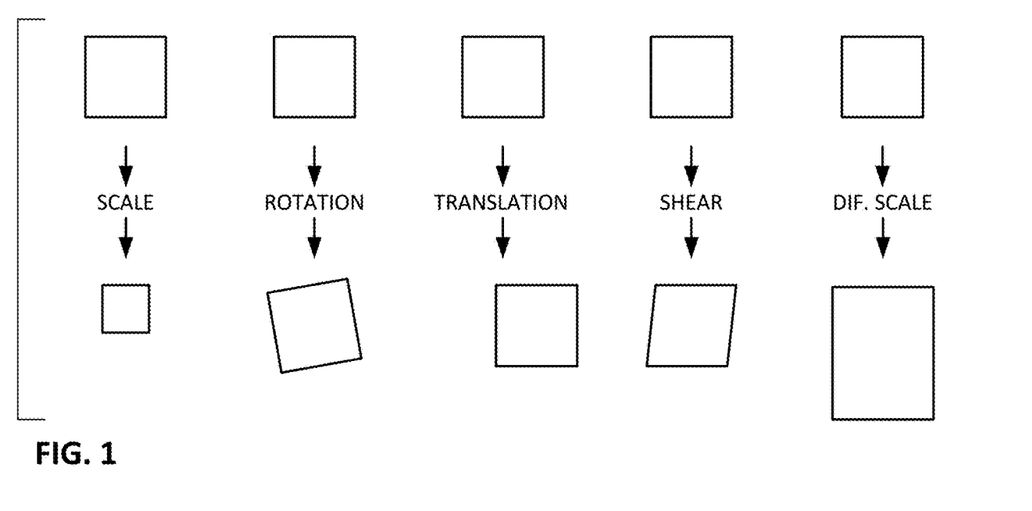
FIG. 1 illustrates different forms of affine distortion.

When such a watermark is printed, and later imaged by a camera, the depiction of the mark is often geometrically distorted relative to the mark's original printed appearance. Different forms of such distortion (termed "affine distortion") are shown in FIG. 1. A watermark commonly includes a known attribute or structure that permits parameters of such affine distortion to be discerned from the captured imagery, so that such distortion can be taken into consideration when decoding the payload from the depicted 2D mark (i.e., to achieve geometric synchronization). This known attribute or structure can take the form of a registration signal that is conveyed in the digital watermark in addition to the payload signal. (The reference signal is sometimes termed a registration signal, a calibration signal, a grid signal, etc.)

An exemplary reference signal is derived from a set of plural (e.g., 8-80) continuous spatial sinusoids that span a 2D spatial block in different directions, with each sinusoid having between 20-60 light-dark alterations—typically with different phases. (An integral number of cycles is desirably used for each sinusoid, to assure that the composite reference signal is continuous at edges of the block, to reduce conspicuous edges if watermark blocks are tiled.) The resulting signal is sampled at uniformly-spaced 2D points to obtain, e.g., a 128×128 element reference signal.

Figure 2A:
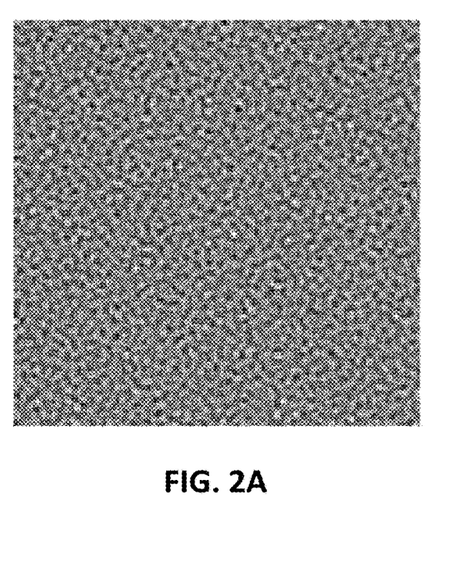
FIGS. 2A and 2B respectively show spatial domain, and spatial frequency domain, illustrations of a reference signal.
Figure 2B:
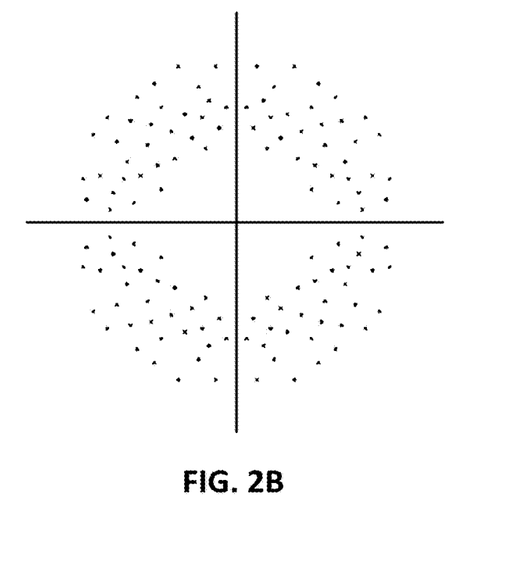

In a Fourier magnitude plot (a representation of a 2D spatial frequency domain), such a signal appears as a distinctive constellation of peaks. FIGS. 2A and 2B show an illustrative reference signal, by its spatial (pixel) domain and Fourier magnitude (spatial frequency) domain plots.

The reference signal is scaled to a small amplitude (e.g., a few digital numbers), and is also combined with respective pixels of the host artwork—as with the payload tweaks discussed above. Alternatively, the array of reference signal elements can be processed with the payload signal elements to yield a sparse marking—independent of host artwork.

After imagery depicting a watermarked object (e.g., a food package printed with watermarked artwork or a sparse mark) is captured by a camera, reading of the watermark data is a two-step process: synchronization and decoding. An illustrative prior art process is outlined in FIG. 3, with synchronization occurring above the dashed line, and decoding below.

Figure 3:
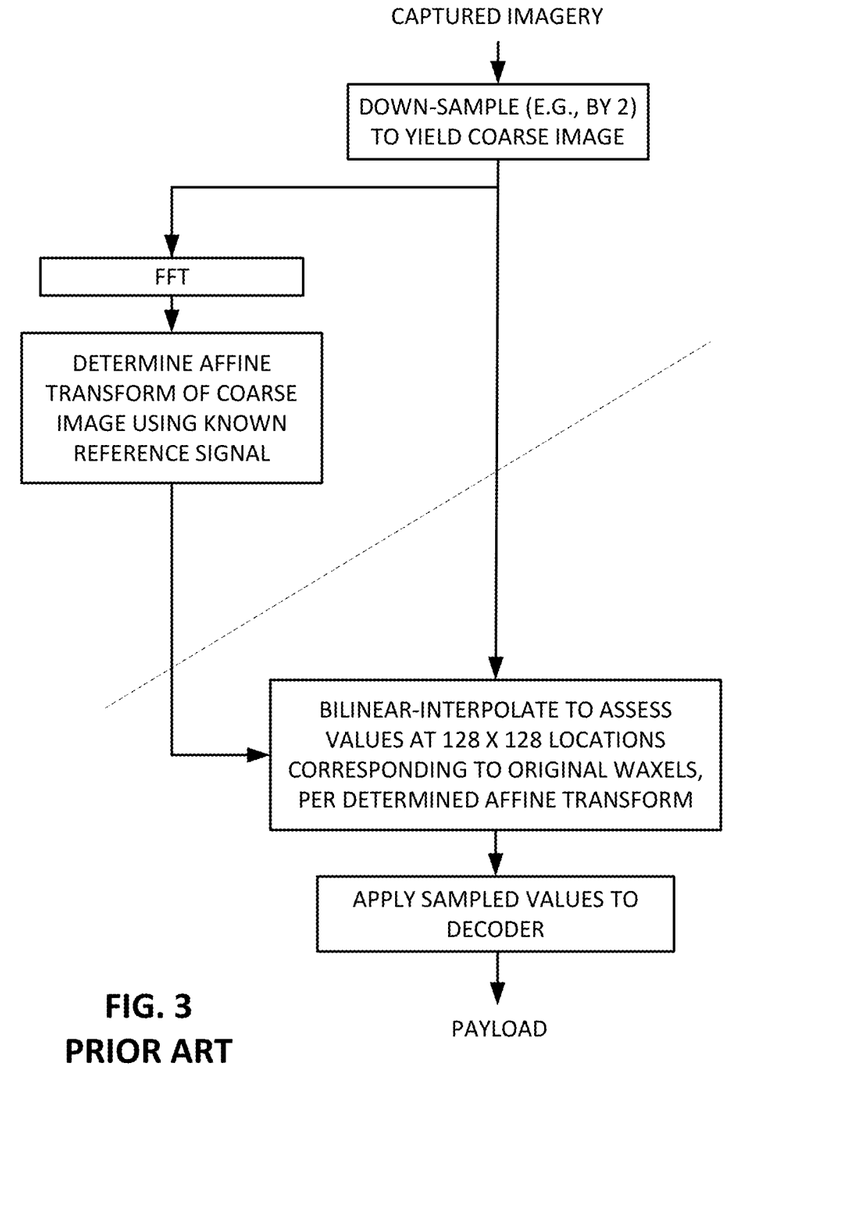
FIG. 3 shows elements of a prior watermark reading method.

Synchronization (aka watermark detection) involves examining the imagery to find the included reference signal. The size, orientation, and position of the reference signal within the imagery reveals how depiction of the 128×128 array of payload data has been geometrically transformed in the captured image, relative to its originally-encoded state.

Locating the reference signal in the captured imagery is commonly performed in the Fourier domain. This generally involves performing an FFT on the image data. To conserve processing resources, and speed results, the input image data is often first down-sampled by a fixed factor "k." The imagery resulting from such down-sampling by $\underline{k}$ may be termed "coarse" imagery.

(Traditionally, the factor $\underline{k}$ has been customized for different watermark detectors, based on their particular circumstances. For a watermark detector implemented in an Apple iPhone device, a typical usage scenario might be reading a watermark from a magazine illustration or a business card, from a distance of ten inches. For a watermark detector implemented in a Datalogic Magellan 9800i supermarket point-of-sale scanner, a typical usage scenario might be reading a watermark from a box of cereal, with a distance to the glass platen of between zero and two inches. (Each of these scenarios further depends on focal length of the lens involved, and the resolution of the camera sensor.) For each prototypical scenario, applicant previously determined what down-sampling factor worked best, overall, in that circumstance (e.g., based on experimentation, or on analysis of illustrative parameters), and selected factor $\underline{k}$ accordingly.)

Various synchronization approaches are known, including a log-polar approach as detailed in U.S. Pat. No. 6,614,914, a least-squares approach as detailed in U.S. Pat. Nos. 9,959,587 and 10,242,434, and an AllPose approach as detailed in application Ser. No. 16/141,587, filed Sep. 25, 2018 (now published as 20190266749). All rely on knowledge concerning the reference signal that was originally included in the watermark signal.

Once the geometric transformation of the coarse imagery is understood through the synchronization process, decoding is performed. This process can start by removing an estimate of the reference signal, since its usefulness has been served and its presence now only serves to contribute noise. (The rotation, translation and scaling of the reference signal within the coarse imagery are known from the synchronization process, so the reference signal can be estimated and subtracted.) The resulting imagery is often high-passed filtered, to attenuate another source of noise, the underlying host imagery (which has many low frequency components). Using the affine transformation data discerned by the synchronization stage (rotation, translation, scaling), the decoder next identifies—by interpolating within the coarse imagery—locations that correspond to the 128×128 original waxel locations, and extracts signal values at such locations. These data are provided to a decoder, which extracts the original payload bits in accordance with the error correction, error detection, and/or repetition coding used in encoding.

(The affine-distorted imagery can be counter-distorted, restoring the waxels to their original 128 row by 128 column presentation, and this array of data can be submitted to the decoder. Alternatively, the affine-distorted imagery can be sampled in accordance with the affine parameters, to obtain values at locations that correspond to the originally-encoded waxels.)

The foregoing is simply a brief overview of one particular prior watermarking reading process, and omits various details and alternatives that are elaborated in applicant's patent documents cited herein.

An exemplary watermark synchronization operation can identify affine transformation of a watermark, in the coarse imagery, over a scale range of about 44%-224%. Consider a cereal box bearing artwork that is watermark-encoded with 128×128 waxel blocks, at 150 waxels per inch (WPI), which is imaged by a point-of-sale scanner. If imagery of this cereal box artwork is captured from a distance where a watermark block is represented as 256×256 pixels, and this image is down-sampled by a factor $\underline{k}$=2 to produce a coarse image of 128×128 pixels, this is regarded as 100% scale (i.e., each waxel in the coarse image has the scale of a single coarse image pixel). If the imagery is captured from a distance where a watermark block is represented as 128×128 (i.e., from a viewpoint relatively remote from the cereal box), then the resulting coarse image is regarded as 50% scale. If the imagery is captured from a distance where a watermark block is captured as 512×512 pixels (i.e., relatively close to the box), then this is regarded as 200% scale.

Figure 4:
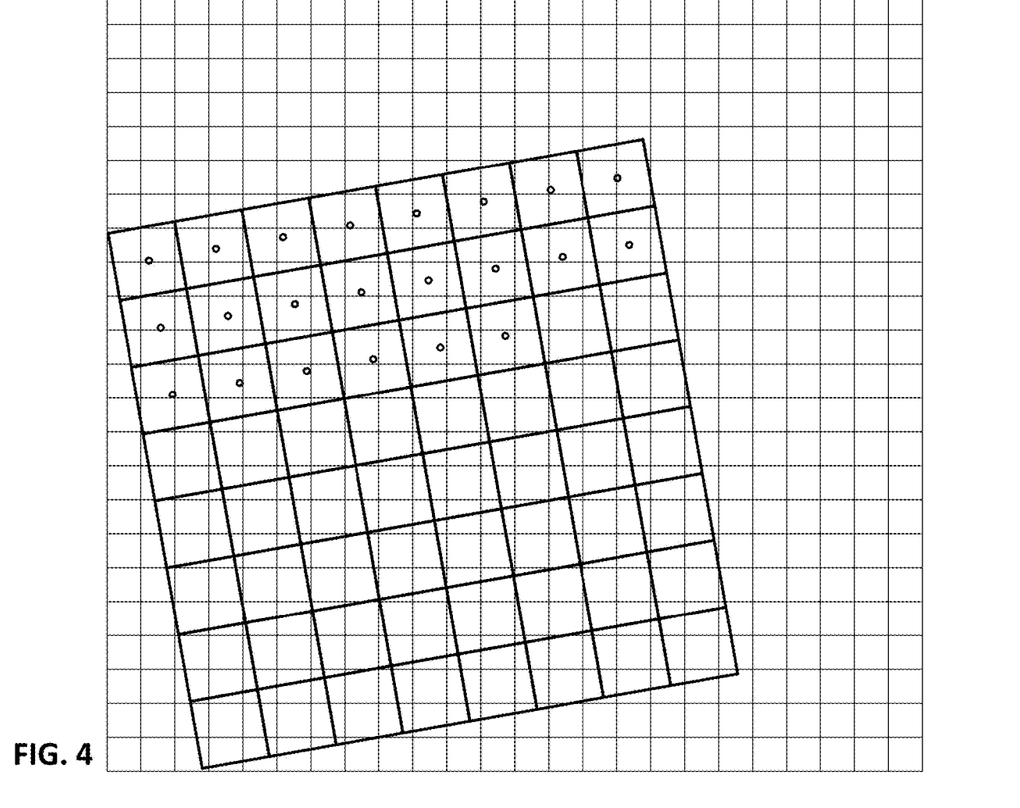
FIG. 4 illustrates an exemplary geometric relationship between pixels of captured imagery, and a watermark block depicted in the imagery.

Of course, in addition to scaling, the captured depiction of the watermark block in the cereal box artwork is also usually distorted by rotation and translation. FIG. 4 shows how waxels of an originally-encoded watermark block (shown by the inclined grid) relate to pixels in a coarse image (shown in the finer lines) having a 200% scale. The small circles show the centers of the waxels.

Applicant has found that the traditional use of bilinear interpolation, to obtain waxel values, leads to undue shot noise interference.

Figures 4A, 4B:
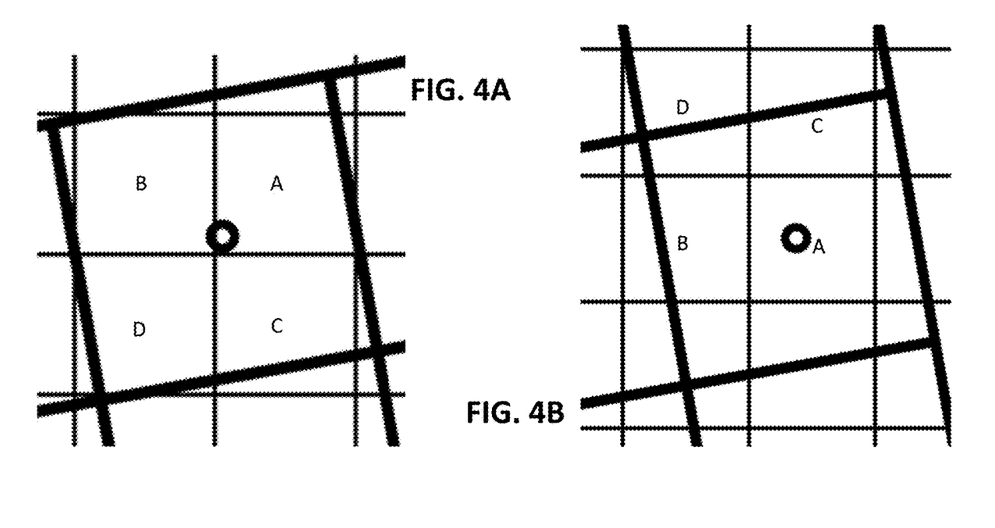
FIG. 4A is an enlarged excerpt from FIG. 4, showing a case where a center of a waxel is near the junction of four captured pixels, so that an interpolated value for the waxel is dependent on the values of four pixels.
FIG. 4B is an enlarged excerpt from FIG. 4, but showing a case where a center of a waxel is near a center of a captured pixel, so that an interpolated value for the waxel is nearly wholly-dependent on the value of this single pixel.

Consider, first, the excerpt enlarged in FIG. 4A. Because the small circle is near the intersection of four coarse pixels, bilinear interpolation will yield a value—for that waxel—nearly equal to the average of the four nearest pixels, A, B, C and D. Each of the four pixels' values will contribute nearly-uniformly to the interpolated result.

A different situation prevails in the excerpt enlarged in FIG. 4B. Because the small circle is near the center of one of the coarse pixels (A), the interpolated result will depend, nearly-exclusively, on the value of this single pixel. The contributions from the other three pixels (B-D) will be nearly nil. A total of three-quarters of the waxel area, within the captured imagery, is essentially disregarded in estimating the waxel value.

Assessing the value of a waxel from the value of a single, small, coarse image pixel (A) is risky business, due to pixel variability (e.g., the standard deviation of shot noise). Just as four coin tosses will sometimes yield 75% heads, discerning a waxel's probable value from a small sample will sometimes similarly yield statistical aberrations.

This problem becomes worse as the physical scale of the watermark decreases, in which case less coarse down-sampling may be used (i.e., smaller values of k). Instead of down-sampling by a factor of 2, some detectors used with watermarks of 150 or more waxels per inch may down-sample by a factor of 1.5, or may not down-sample at all. The number of pixels corresponding to each waxel is then larger (due to less down-sampling), and picking the value of one pixel as representative of the entire waxel further increases the statistical aberration.

This problem is particularly acute where the captured imagery is bright—with pixel values near the top of the sensor's dynamic range (e.g., near 255 in an 8-bit image sensor). Shot noise increases in magnitude with luminance. So does its standard deviation. These interference sources are thus at their worst in such bright images. And images that are captured with the subject close to the imager (e.g., as in images at 200% scale) are also typically captured with the subject close to the light source—making them bright.

Figure 5:
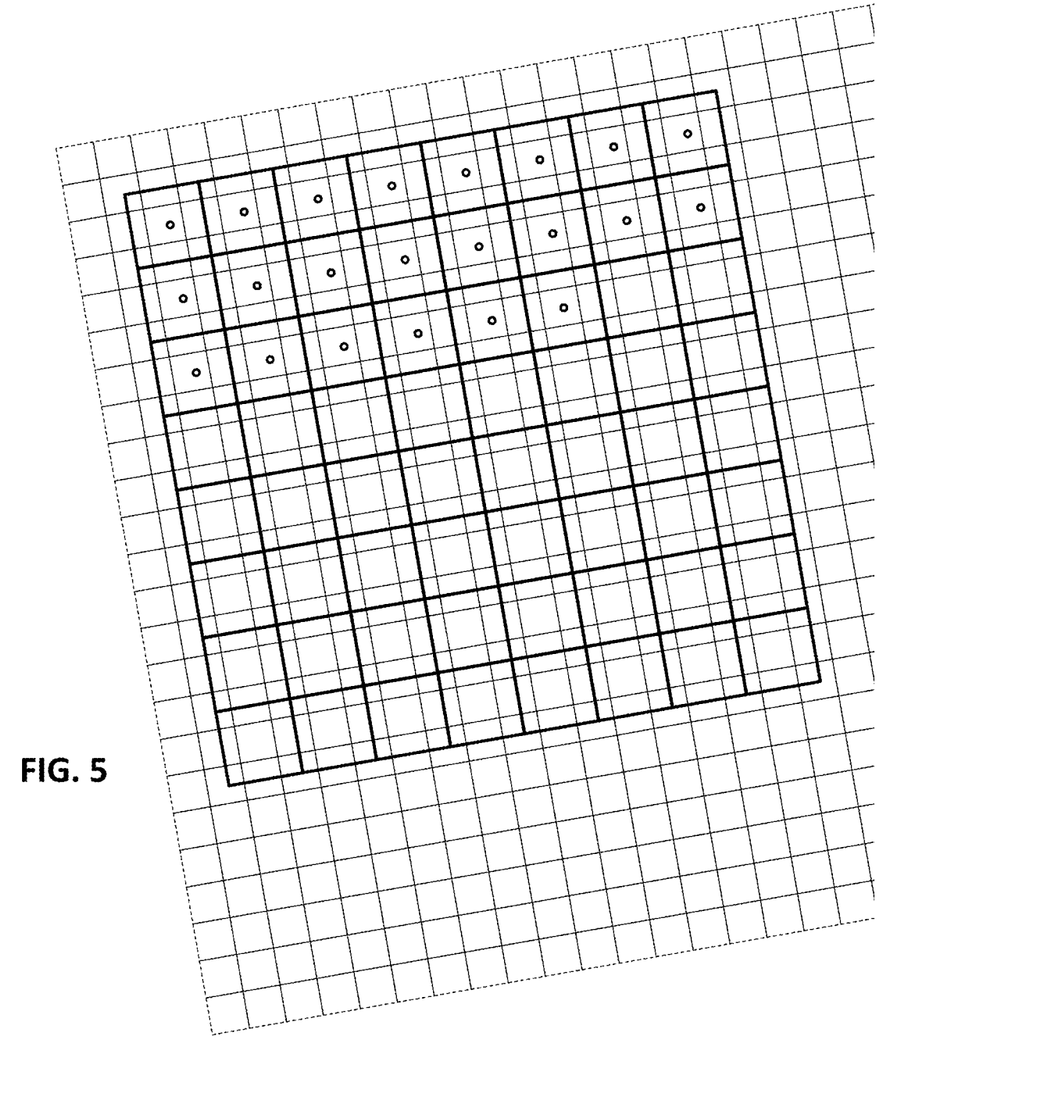
FIG. 5 shows a geometric relationship between pixels of imagery, and a watermark block depicted in the imagery, after the imagery has been rotated and shifted to counteract rotation and translation detected from a watermark reference signal.

FIGS. 4, 4A and 4B illustrate the sampling problem when interpolation is applied before counter-rotation to undo the discerned rotation. But the same problem persists regardless of the order in which affine counter-distortion operations are applied. FIG. 5 shows one such a scenario, when interpolation is to be applied after the coarse pixel array has been counter-rotated (un-doing discerned rotation) and shifted (un-doing discerned translation). Again, the interpolation operation may yield results essentially dominated by the values of isolated pixels within the coarse image, each representing only a small fraction of a waxel's extent. In fact, because the center of each waxel falls near the center of a coarse image pixel, the bilinearly-interpolated value of every waxel in FIG. 5 depends, nearly wholly, on the value of a single pixel—a pixel which spans just a quarter of the waxel's area.)

Figure 6:
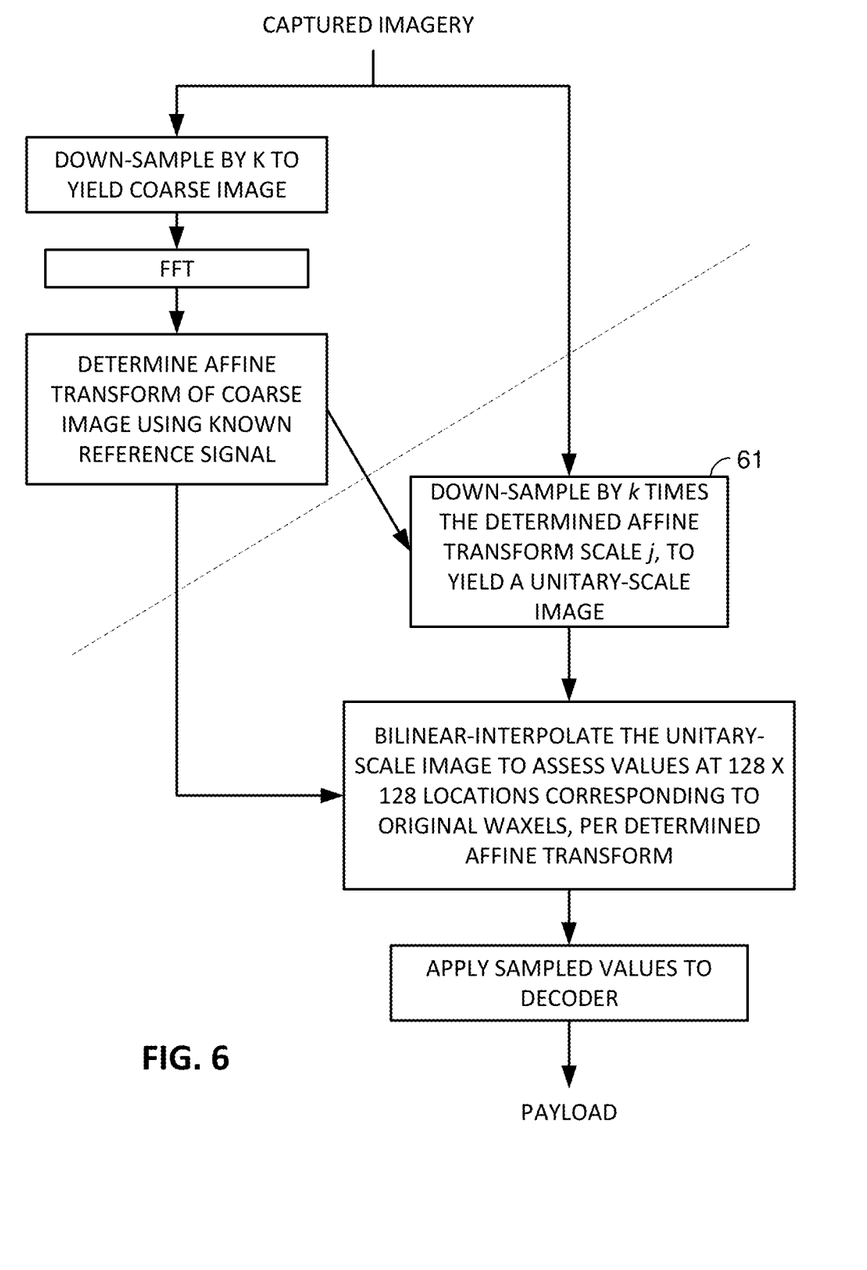
FIG. 6 illustrates elements of one particular embodiment of the present technology.

To redress this problem, and to provide other benefits, applicant has adopted the advantageous arrangement shown in FIG. 6. In the illustrated process, the waxel values are not derived from the coarse image that was down-sampled by $\underline{k}$ to perform the FFT. Instead, a different down-sampling operation 61 is performed on the captured imagery. This different down-sampling operation reduces the original image scale by the product of the coarse down-sampling factor $\underline{k}$, and a scaling factor "j" determined during the affine distortion analysis of the coarse image by the synchronization stage (or an approximation thereof). In the example just-discussed, in which a watermark block in the cereal box imagery is captured as 512×512 pixels, and is coarse down-sampled by $\underline{k}$=2 and yields an image at 200% scale (i.e., $\underline{j}$=2), this second down-sampling operation reduces the input image by $\underline{kj}$=2×200%, or a factor of 4. The resulting image is termed a unitary-scale image, and here has dimensions of 128×128.

Figure 7:
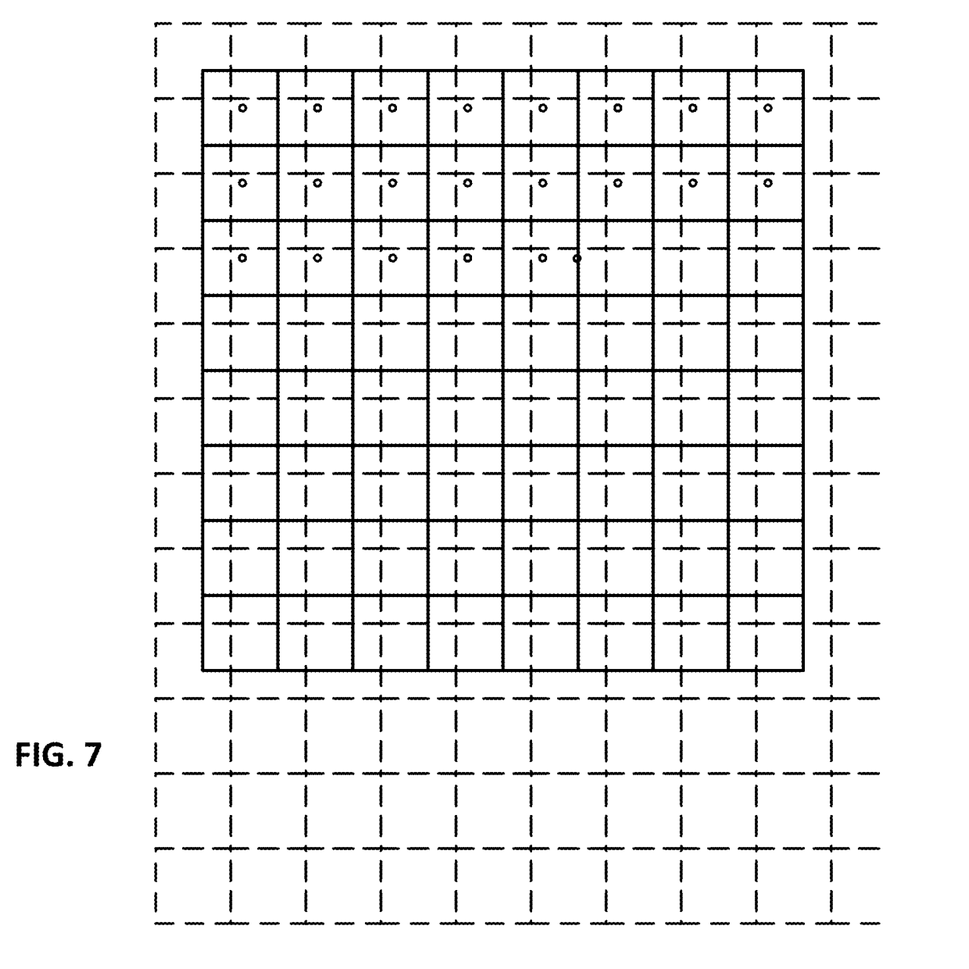
FIG. 7 shows a geometric relationship between pixels of imagery after adaptive down-sampling, and a watermark block depicted in the imagery, wherein estimation of the waxel values is not subject to the problem illustrated by FIG. 4B.

FIG. 7 is similar to FIG. 5, but shows the relation between the waxels of the watermark block (the inclined grid) and the just-discussed unitary scale image. Each waxel is still assigned a value based on a bilinear interpolation operation, but the discussed shortcoming of the FIG. 4 arrangement is overcome.

In particular, when the waxel center is near the junction of four pixels in the unitary scale image (as in FIG. 7), the interpolated value is based on four pixels' values—nearly-equally weighted, as before. However, unlike before, when the waxel center is near the center of one of the pixels in the unitary scale image, and this single pixel dominates the interpolated waxel value, that is fine, because the pixel no longer spans just a small area of the waxel. Instead, the pixel has an area coextensive with that of the waxel (or nearly so). Statistical irregularities arising from estimating a waxel value based on just a minor sub-area are avoided. Shot noise randomness (standard deviation) associated with the FIG. 3 process is relatively attenuated in the FIG. 5 process, due to the scale-dependent down-sampling to achieve a unitary scale image.

For speed and computational efficiency, applicant prefers to perform the different down-sampling operation 61 based on box-filtering. Using a 2×2 filter kernel allows down-sampling by a factor of 2; a 3×3 kernel allows down-sampling by a factor of 3; etc.

Other down-sampling ratios can be achieved by cascading up-sampling and down-sampling operations. For example, consider captured imagery that depicts a watermark block as an array of 320×320 pixels. After down-sampling by $\underline{k}$=2, a coarse image of size 160×160 results. The synchronization process thus reports $\underline{j}$=1.25, indicating the original captured image should be down-sampled by a factor $\underline{kj}$=2.5. Down-sampling the original image by 2.5 is done by up-sampling by a factor of 2, i.e., replacing every element in the 320×320 array by a 2×2 block of same-valued pixels. A 640×640 array results. This array is then down-sampled by 5, using a 5×5 box filter. The result is a 128×128 array. Down-sampling by any ratio that can be expressed as a $\underline{p}/\underline{q}$ fraction can be similarly executed—by first upsampling by a factor of $\underline{q}$, and then box-filtering by a factor $\underline{p}$.

It is not necessary for the different down-sampling operation 61 yield a unitary-scale image of exactly 128×128 elements. Due to error-correcting decoding, correct payloads can be extracted over a wide variety of scale sizes. The fraction $\underline{p}/\underline{q}$ can thus be an approximation of $\underline{jk}$. However, to achieve the best performance, the closer to 128×128, the better.

In some embodiments, a lookup table or similar data structure is employed to identify suitable values $\underline{p}$ and $\underline{q}$ to perform the different down-sampling operation 61, based on the determined affine scale $\underline{j}$ of the coarse-sampled input image, and FFT down-sampling factor $\underline{k}$.

One such table, based on discerned affine scale $\underline{j}$ of the coarse image, with $\underline{k}$=2, defines values of $\underline{p}$ and $\underline{q}$, and the different down-sampling ratio $\underline{p}/\underline{q}$, as follows:

TABLE I

| Affine Scale j of Coarse Image | p | q | p/q | Average block side length after down-sampling, in pixels |
|---|---|---|---|---|
| 0.44-0.54 | 1 | 1 | 1 | 113-138 |
| 0.54-0.65 | 6 | 5 | 1.2 | 115-139 |
| 0.76-0.79 | 7 | 5 | 1.4 | 139-144 |
| 0.79-0.91 | 5 | 3 | 1.67 | 121-139 |

TABLE I-continued

| Affine Scale j of Coarse Image | p | q | p/q | Average block side length after down-sampling, in pixels |
|---|---|---|---|---|
| 0.91-1.08 | 2 | 1 | 2 | 116-138 |
| 1.08-1.25 | 7 | 3 | 2.33 | 119-137 |
| 1.25-1.49 | 8 | 3 | 2.67 | 120-143 |
| 1.49-1.83 | 10 | 3 | 3.33 | 115-141 |
| 1.83-2.24 | 4 | 1 | 4 | 117-143 |

Another implementation uses a simpler table, e.g.:

TABLE II

| Affine Scale j of Coarse Image | p | q | p/q | Average block side length after down-sampling, in pixels |
|---|---|---|---|---|
| 0.44-0.59 | 1 | 1 | 1 | 113-151 |
| 0.59-0.84 | 7 | 5 | 1.4 | 108-154 |
| 0.84-1.16 | 2 | 1 | 2 | 108-148 |
| 1.16-1.63 | 8 | 3 | 2.67 | 111-156 |
| 1.63-2.24 | 4 | 1 | 4 | 104-143 |

(The limits of 0.44 and 2.24 in Tables I and II are due to constraints of the particular synchronization process used, since synchronization typically searches for the reference signal only across a defined range of scale states. Naturally, in other embodiments, other limits could be implemented.)

As indicated, the ratio p/q approximates, but rarely perfectly matches, the ratio jk needed to bring the depiction of the watermark block in the input imagery to a scale state of exactly 1.0 (e.g., 128×128) in the unitary-scale image. For example, in the Table I arrangement, if the coarse scale is 0.54, then the originally-captured image depicts a block as 138 pixels on a side. (Recall that coarse scale is after down-sampling by 2.0.) After the captured imagery is down-sampled by 1.2 (the second row in the table), the block is depicted as 115 pixels on a side. In the Table I arrangement, this latter pixel measurement can differ from the original 128 pixel measurement by up to 13% (which occurs in the case of a scale of 0.79, which may yield a depicted average block side of 144 pixels). That is, in Table I, p/g can differ from jk by up to 13%. In Table II, the difference ranges up to 22%. (The Tables refer to average block side lengths in recognition of the fact that most blocks are captured with some differential scaling or other distortion, so the average of the four sides of a block is a convenient measure.)

Figure 8A:
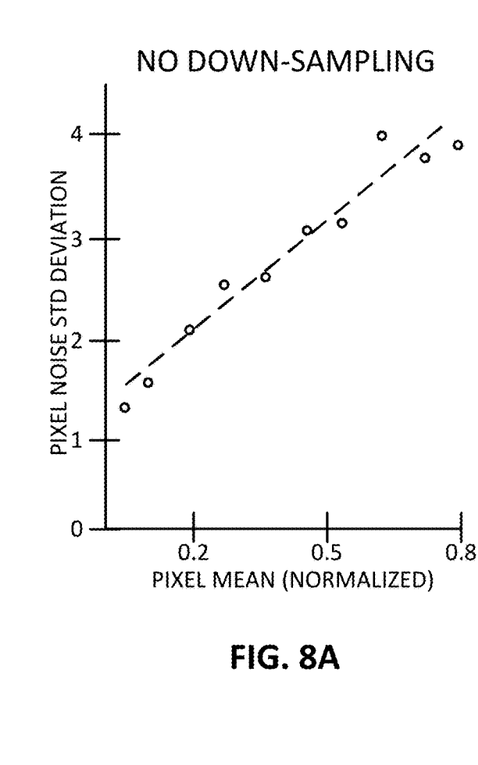
FIGS. 8A, 8B, and 8C show image sensor noise measurements with different down-sampling factors.
Figure 8B:
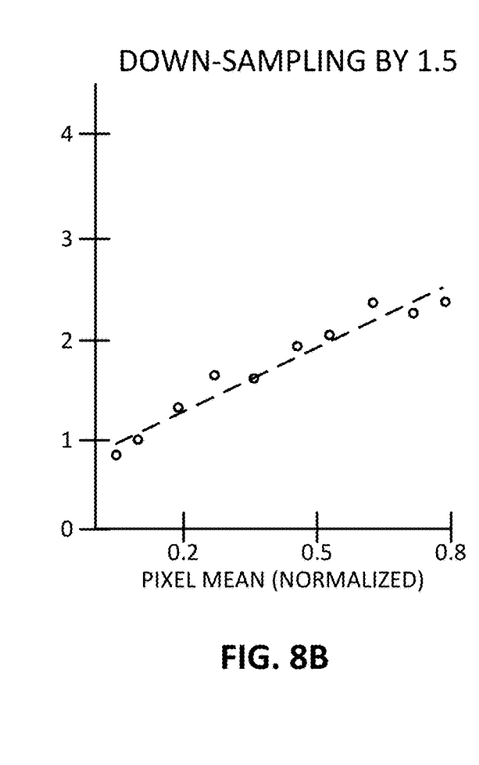
Figure 8C:
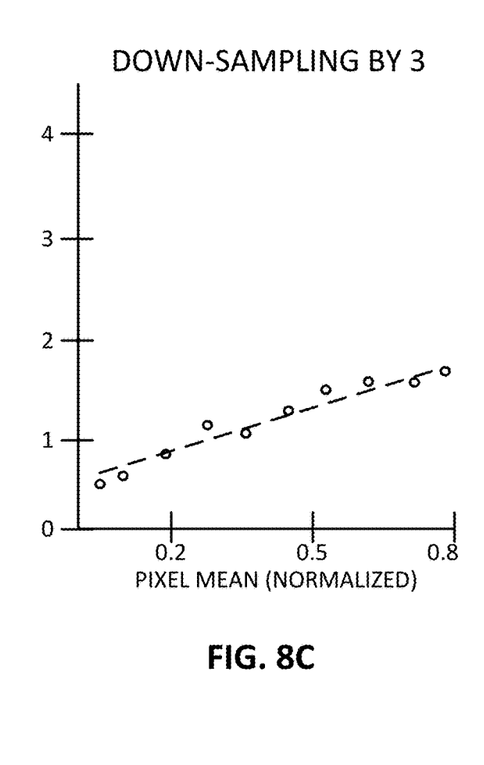

FIG. 8A shows the standard deviation of pixel noise as a function of pixel intensity (with pixel values of 0-255 normalized to 0-1), with 660 nanometer illumination, for an illustrative sensor. The circles show measured data; the dashed line is a least-squares fit. FIG. 8B shows how this standard deviation diminishes if the pixels are down-sampled by 1.5. FIG. 8C shows the further diminution in standard deviation if the pixels are down-sampled by 3. It will be recognized that the greater the down-sampling, the less the risk that sensor pixel noise will be mistaken for watermark signals, and thus the greater the reliability of watermark reading.

(It should be understood that the present technology contemplates imaging systems that access image data before smoothing, i.e., unfiltered image data. Some imaging systems address shot noise by image smoothing instead.)

While the detailed arrangement improves decoding results in imagery captured at close distances, by mitigating pixel noise, it also improves decoding results in imagery captured at far distances. This latter advantage is due to avoiding significant under-sampling of the watermark block within the captured image.

As noted, when a captured image is traditionally processed, it is first down-sampled by a factor k (e.g., k=2), and then processed to extract an estimate of the 128×128 waxel values originally-encoded in the imagery. However, if the representation of a watermark block in the originally-captured imagery spans less than a 256×256 pixel area, then down-sampling by 2 will yield under-sampled data of size smaller than 128×128. If the originally-depicted watermark block is 160×160 pixels, the down-sampled coarse data will depict the block as 80×80 pixels. The interpolation operation will up-sample the data as needed to produce 128×128 data, but information and detail that were lost during the down-sampling cannot be retrieved.

While the decoder can generally successfully extract the watermark payload from an 80×80 coarse image (or even from a 64×64 coarse image), robustness statistics suffer. Over many such trials, the decoder may achieve a 99% success rate, instead of the 99.9 . . . % success rate it would achieve decoding a coarse image in which the watermark is represented by 128×128 data.

Detection rates especially fall off if the watermark block is under-sampled within the coarse image and the watermark is weak to begin with. (Watermark signals may be weak for various reasons. They may be deliberately encoded at a low amplitude, so as to make the watermark encoding less conspicuous on the printed object. Or weakness may be due to impairment of the encoded signal—such as by the printed substrate being worn or damaged, or being imaged with glare. The imaging system may also impair the watermark signal, such as by a smudge on a glass surface in the imaging path.)

By the present arrangement, in which a different down-sampling factor is applied for decoding after the synchronization process has determined coarse watermark scale j, this under-sampling liability is eliminated. The unitary-scale image is reliably near 128×128 in size. For example, in the case illustrated by Table I, above, the image after application of the p/q downsampling is never smaller than 113×113 pixels over the indicated range of scales. (It is also never larger than 144×144.) In the Table II example, the p/q-down-sampled image is never smaller than 104×104 pixels (and never larger than 156×156) over the indicated range of scales.

Decoding is not so readily stressed to the point of failure by weak watermark signals, because the error-correction coding is not so challenged by under-sampled watermark blocks. If the watermark signal block is captured from a greater-than-normal distance, systems employing the presently-detailed aspect of the technology will not down-sample as much, because the originally-captured block is already depicted at a smaller scale.

Thus, by adaptively down-sampling the original captured imagery only after a synchronization process has determined a watermark scale (i.e., after the captured imagery has already been down-sampled once prior to FFT calculation, in the illustrated arrangement), the present technology improves watermark detection reliability—both for images that are captured at close-in and far-out distances. Tests show improvements in read reliability ranging from 5% to 30%, depending on circumstances.

This improved watermark reading reliability can be leveraged to provide increased functionality. Previously, the payload capacity of watermarks was limited, in significant part, by the issues of sensor noise in close-in images, and under-sampling of far-out images, both of which caused decoding probability to fall-off. The present arrangements enable use of larger watermark payloads, while still meeting or exceeding prior art read-reliability. For example, in an illustrative implementation, the present technology enables a watermark conveying a 56-bit payload to be successfully decoded with the same or better reliability as a prior art system decoding a watermark of the same strength conveying a 48-bit payload.

Alternatively or additionally, the improved reliability afforded by the present technology enables the encoding strength of a watermark to be reduced, making the marking even less conspicuous to human viewers, while still maintaining the readability of stronger, prior art watermarks.

Still further, the improved read reliability provided by the present technology enables the watermark signal energy to be re-allocated between reference signal and message payload. Since decoding of the message payload is no longer quite as hindered by shot noise and under-sampling, it can be encoded relatively more weakly, enabling relatively more energy to be devoted to the reference signal—improving detection of the watermark in otherwise marginal conditions.

Dual Detection

As watermarks proliferate they sometimes appear at different scales (e.g., 150 WPI and 75 WPI) within the same setting, such as a retail store. Each may convey a payload encoded in a 128×128 waxel array. And both may sometimes fall within the detection range of a single watermark detector, due to the 44%-224% scale range that can be accommodated by an exemplary detector. However, the range of viewing distances for which both marks fall within the 44%-224% scale range is limited.

For example, at a first viewing distance, a first, 75 WPI, mark may be captured at a 100% scale, and a second, 150 WPI, mark imaged from the same distance may be captured at a 50% scale. But if the viewing distance is increased much more, the 150 WPI mark becomes too small (falling below the 44% limit). In another example, at a second viewing distance, the first, 75 WPI, mark may be captured at a 200% scale, and the second, 150 WPI, mark imaged from the same distance may be captured at a 100% scale. But if the viewing distance is reduced much more, the 75 WPI mark becomes too large (exceeding the 224% limit).

Detection, in such contexts, can be aided by producing a signal that depicts such first and second watermarks at a consistent scale—despite their different original scales.

Figure 9A:
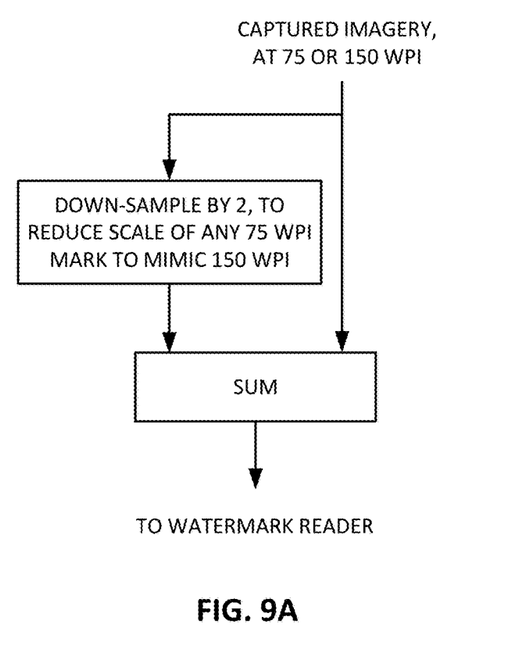
FIGS. 9A and 9B illustrate exemplary arrangements for detecting both 75 WPI and 150 WPI watermarks.

One such arrangement is shown in FIG. 9A. Input imagery is down-sampled by a factor of 2 and summed with the original imagery. The result is provided to a digital watermark detector configured for 150 WPI watermarks (i.e., configured so that such watermarks, at a nominal expected viewing distance, have a scale $j$ of 100%).

If the input imagery actually does depict a 150 WPI watermark, it will be detected as-is in the summed data. The down-sampled imagery summed with it serves only as noise.

Conversely, if the input imagery depicts a 75 WPI watermark, its down-sampling by two effectively shrinks the data set, mimicking a 150 WPI mark. This down-sampled data will be detected in the summed data, with the original imagery serving as noise.

In such embodiment, down-sampling can be achieved by discarding alternate rows and columns of data. Or by box-filtering.

Figure 9B:
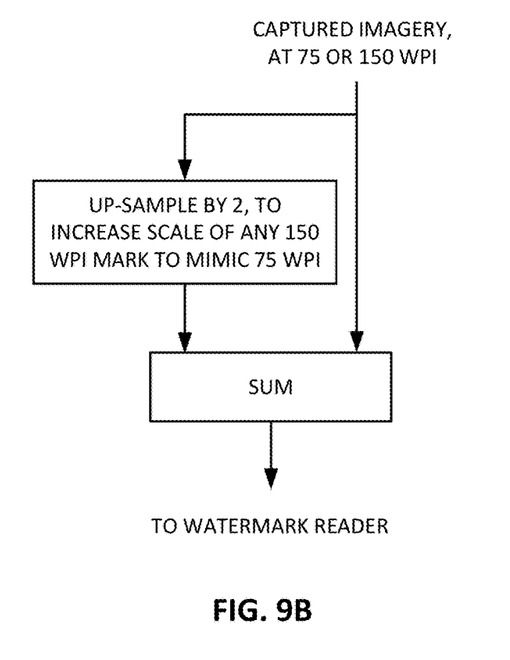

A related embodiment uses upsampling. Input imagery is up-sampled by a factor of 2 and summed with the original imagery. The result is provided to a digital watermark detector configured for 75 WPI watermarks. If the input imagery actually does detect a 75 WPI watermark, it will be detected as-is in the summed data; the up-sampled imagery summed with it serves only as noise. If the input imagery depicts a 150 WPI watermark, its up-sampling by two effectively expands the data set, mimicking a 75 WPI mark. This up-sampled data will be detected in the summed data, with the original imagery serving as noise.

Naturally, such principles can be extended to watermarks of different resolutions, and can be extended to three or more different watermark resolutions.

CONCLUDING REMARKS

Having described and illustrated the principles of our inventive work with reference to illustrative examples, it will be recognized that the technology is not so limited.

For example, while the described embodiments employ a reference signal comprised of peaks in the Fourier magnitude domain, it will be recognized that the reference signal can exhibit peaks in different transform domains.

Moreover, it is not necessary for a digital watermark signal to include a distinct reference signal for geometrical synchronization purposes. Sometimes the payload portion of the watermark signal, itself, has known aspects or structure that allows geometrical synchronization without reliance on a separate reference signal.

It will be recognized that embodiments simpler than those detailed can be realized. One simplification is to skip the different down-sampling operation 61 before decoding, and instead re-use the imagery earlier down-sampled by factor $k$ for use by the FFT, if down-sampling by the same factor is again indicated. For example, such data can be re-used if the needed down-sampling factor is $k$ or less, and the captured imagery can otherwise be down-sampled by $k+1$ (e.g., by box filtering). For the case of k=2, such arrangement can be represented by the following table:

TABLE III

| Affine Scale j of Coarse Image | p | q | p/q |
|---|---|---|---|
| <1 | — | — | Re-use data for FFT |
| >1 | 3 | 1 | 3 |

Another simplification is to skip the different down-sampling operation 61 before decoding, if the synchronization process indicates that the scale of the coarse image is near 50%. This indicates the scale of the originally-captured image is near 100%, so no down-sampling is needed—the captured imagery can be used for decoding without scaling. An illustrative such arrangement is shown in the following table (again for the case k=)

TABLE IV

| Affine Scale j of Coarse Image | p | q | p/q |
|---|---|---|---|
| <0.71 | — | — | Use captured imagery |
| >0.71 | 2 | 1 | 2 |

Still another embodiment combines these two simplifications, e.g.:

TABLE V

| Affine Scale j of Coarse Image | p | q | p/q |
|---|---|---|---|
| <0.71 | — | — | Use captured imagery |
| 0.71-1.73 | — | — | Re-use data for FFT |
| >1.73 | 3 | 1 | 3 |

While the first down-sampling operation (by factor $\underline{k}$) is typically applied to the entire captured image, the second down-sampling operation (e.g., by factor $\underline{p}/\underline{q}$) is typically not. Instead, this latter down-sampling is commonly applied to a patch of the captured imagery centered at a location where the reference signal is detected. (The center of the watermark block is often used. Its location is known from the scale and translation of the detected reference signal.) The patch is larger than a single watermark block, e.g., spanning two or three blocks in width and height. This enables the decoder to employ data from parts of two or more adjoining watermark blocks in extracting the watermark payload, thereby increasing confidence in the results.

Although the technology is described as employing a box filter for down-sampling, followed by bilinear interpolation among down-sampled pixel values to determine waxel values at affine-corrected sample points, this sacrifices some information. Preferable is to down-sample the original image by applying a blurring kernel, such as a Gaussian kernel, and sub-sampling the Gaussian-blurred image to obtain the waxel values. The size of the Gaussian kernel can correspond to the needed down-sampling factor. For example, if a down-sampling factor of 2 is indicated, then a 2×2 Gaussian blurring kernel can be applied, with a standard deviation that is optimized empirically.

The processes and system components detailed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC). Additional details concerning special purpose electronic circuitry are provided in U.S. Pat. No. 9,819,950.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Details concerning watermarking that can be included in implementations of the present technology are disclosed in applicant's previous patent filings, including U.S. Pat. Nos. 6,122,403, 6,590,996, 6,614,914, 6,975,744, 9,747,656, 9,959,587, 10,242,434, 20190332840, 20170024840, and 20160364623, and pending application Ser. No. 16/002,989, filed Jun. 7, 2018 (published as 20190171856), Ser. No. 16/141,587, filed Sep. 25, 2018 (published as 20190266749), and PCT/US19/19410, filed Feb. 25, 2019 (published as WO/2019/165364).

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A method comprising the acts:
   capturing imagery depicting a packaged retail item, using a 2D image sensor having at least 256 rows by 256 columns of photodetectors;
   down-sampling unfiltered data from the 2D sensor by a scale factor k, to produce a first set of down-sampled imagery;
   performing an FFT on the first set of down-sampled imagery, transforming the captured imagery into frequency domain image data;
   determining affine transformation of a digital watermark signal within the frequency domain image data, including an affine scale factor j;
   down-sampling the unfiltered data from the 2D sensor, said down-sampling comprising first upsampling by a factor q, and then down-sampling by a factor p using box-filtering, wherein a ratio p/q differs from a product jk by 5% to 25%; and
   providing the second set of down-sampled imagery to a digital watermark decoder to extract plural-bit payload data conveyed by the digital watermark signal;
   wherein pixel noise in the second set of down-sampled imagery has a lower standard deviation than pixel noise in the first set of down-sampled imagery.

2. The arrangement of claim 1 in which the packaged retail item bears a digital watermark signal printed at a resolution of 150 waxels per inch.

3. The arrangement of claim 1, performed first and second times, once on a first input set of captured imagery and once on a second input set of captured imagery, wherein the first time the method is performed, the product jk is greater than k, and the second time the method is performed, the product jk is less than k.

4. A point of sale scanner apparatus for a retail checkout, comprising:
   first means for estimating a scale of a digital watermark signal within captured imagery; and
   second means, responsive to scale data produced by the first means, for producing transformed image data to be provided to a digital watermark decoder, wherein noise in the transformed image data has a smaller standard deviation than noise in the captured imagery.

5. A method comprising the acts:
   capturing 2D image data from a substrate region that is mostly unprinted, said substrate region bearing a dot pattern that encodes plural bits of information, the captured 2D image data depicting the substrate region from an unknown distance, resulting in an unknown pixels-of-imagery-per-inch-of-substrate scale;
   down-sampling the captured 2D image data by a first factor, yielding first down-sampled 2D image data;
   determining a scale factor for the dot pattern depicted in the first down-sampled 2D image data;
   down-sampling the captured 2D image data by a second factor based on said determined scale factor, yielding second down-sampled 2D image data; and
   decoding said plural bits of information from the dot pattern depicted in said second down-sampled 2D image data.

6. The method of claim 5 in which the substrate region is mostly white.

7. The method of claim 5 in which the captured 2D image data is not pre-filtered by a smoothing operation prior to said down-sampling by the second factor.

8. The method of claim 5 in which the captured 2D image data is filtered by a Gaussian blurring kernel prior to said down-sampling by the second factor, wherein the size of the blurring kernel is selected in accordance with said determined scale factor for the dot pattern.

9. The method of claim 5 in which the first down-sampling operation, by the first factor, processes a first patch of captured 2D image data, and in which the second down-sampling operation, by the second factor, processes a second patch of captured 2D image data that is smaller than the first patch.

10. The method of claim 9 in which the dot pattern encodes plural bits of information organized in a 128×128 waxel block, and the second patch is larger than a single 128×128 waxel block.

11. The method of claim 5 in which the dot pattern was printed on the substrate at a first scale, and the down-sampling of the captured 2D image data by the second factor does not restore a scale of the dot pattern depicted in the second down-sampled 2D image data to said first scale.

12. The method of claim 5 in which:
   the dot pattern encodes plural bits of information organized in a 128×128 waxel block;
   more than one such block is formed on the substrate;
   the second down-sampled 2D image data depicts a single block with an average side length of M pixels; and
   M is between 113 and 121.

13. The method of claim 12 in which:
   the dot pattern encodes plural bits of information in a 128×128 waxel block;
   more than one such block is formed on the substrate;
   the second down-sampled 2D image data depicts a single block with an average side length of M pixels; and
   M is between 104 and 113.

14. The method of claim 5 in which more than 75% of the substrate region is unprinted.

15. The method of claim 5 in which down-sampling the captured 2D image data by the second factor comprises first upsampling by a factor q, and then down-sampling by a factor p using box-filtering.

16. The method of claim 15 wherein a ratio p/q differs from a product jk by 5% to 25%.

17. The method of claim 5 that further includes bilinear interpolating of the second down-sampled 2D image data, and decoding said plural bits of information from data resulting from said interpolating.

18. The method of claim 5 in which, a 5:1 span of first down-sampled 2D image data scales results in 1.5:1 or less span of second down-sampled 2D image data scales.

* * * * *